Aug. 1, 1939.   H. SAUER ET AL   2,168,273
STEREO-OPTIC INSTRUMENT
Filed Oct. 30, 1937   2 Sheets-Sheet 2
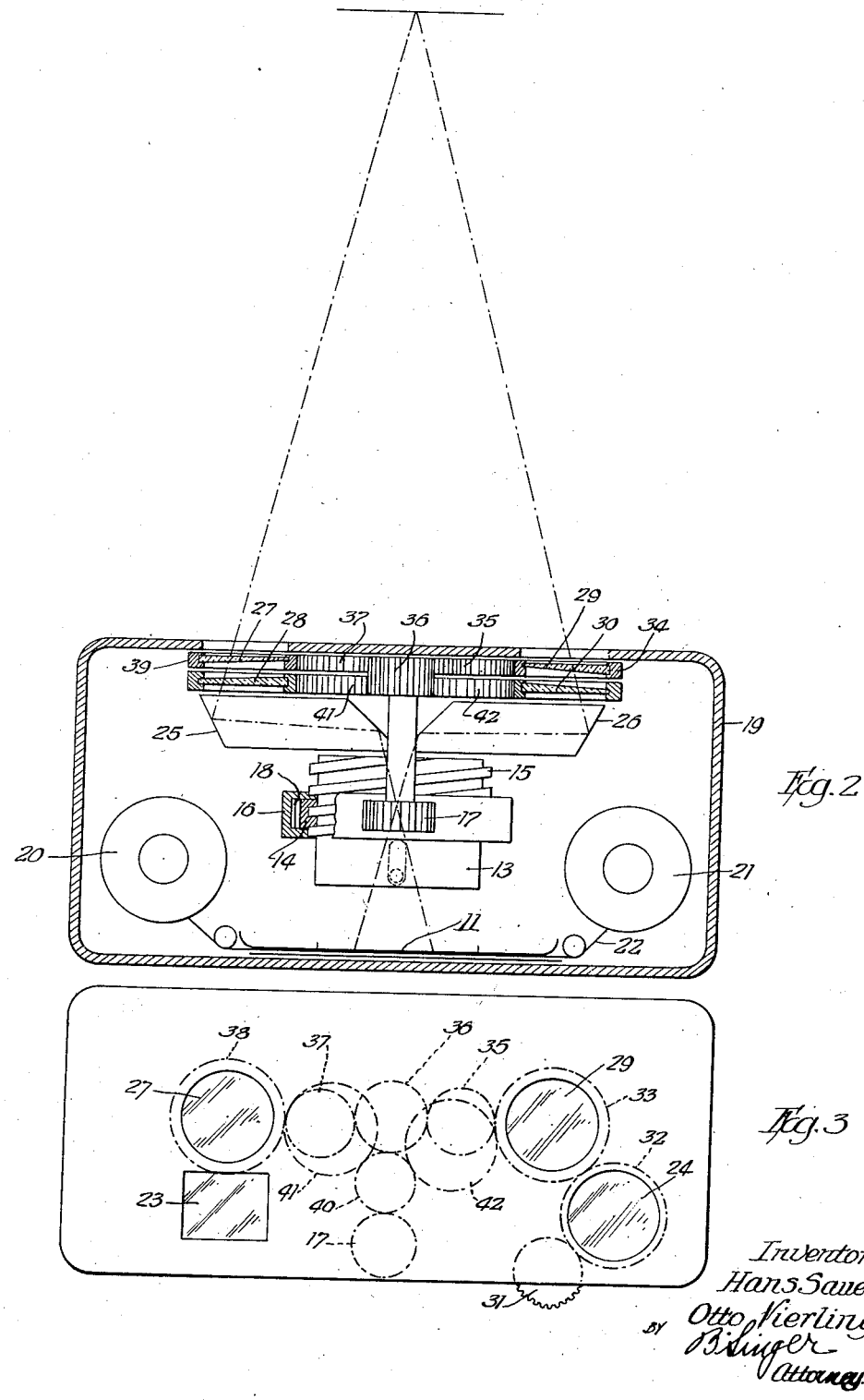

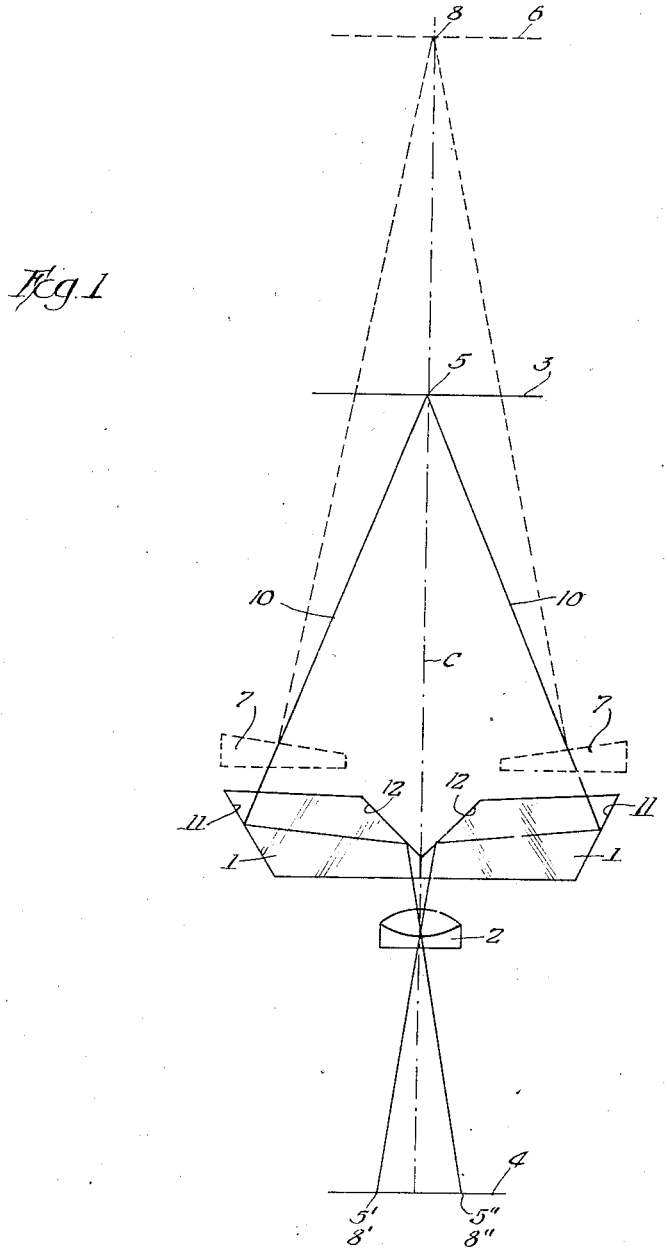

Patented Aug. 1, 1939

2,168,273

UNITED STATES PATENT OFFICE 2,168,273

STEREO-OPTIC INSTRUMENT

Hans Sauer and Otto Vierling, Dresden, Germany, assignors to Zeiss Ikon Aktiengesellschaft, Dresden, Germany Application October 30, 1937, Serial No. 171,999
In Germany October 30, 1936

6 Claims. (Cl. 95—18)

This invention relates to improvements in stereo-optic instruments.

It is an object of the invention to provide a stereo-optic instrument for production as well as reproduction of pictures creating upon observation the same impression as observation of an object represented by the picture by both eyes.

It is also an object of the invention to improve this impression created by the stereoscopic pictures to produce a greater similarity of the impression produced by these pictures to binocular observation as had been the case up to the present time.

In binocular observation the two eyes automatically accommodate themselves to assume a certain position of convergence for properly and sharply viewing the object regardless of the distance of the object from the observer. In stereoscopic devices as they are known at the present time, the plane of convergence defined as a plane perpendicular to the axis of the optical system and intersected on a point of the axis of the system by the rays which produce the stereoscopic part-images is assumed to have a fixed distance from the lens through which the stereoscopic part-images are produced or reproduced respectively. This selection of a fixed distance of the plane of convergence of the optical system frequently proves a hardship to the observer of the stereoscopic pictures inasmuch as many observers of such pictures have difficulties in automatically securing that accommodation of the eye muscles to the views presented by the pictures which would lead to a single impression similar to the single impression created by binocular vision.

It is, therefore, an object of the invention to eliminate the defect due to the selection of a plane of convergence at a fixed distance from the lens of the system and to provide, therefore, in functional association with the stereo-optic system means which permit the plane of convergence to be virtually shifted to selectively varying distances from the lens.

Another object of the invention is to combine the means for the virtual establishment of a plane of convergence different from the fixed plane of the optical system with the means for focusing the lens of the system whereby upon adjustment of the focal distance of the lens in accordance with the requirements, also a new position of the plane of convergence is selected.

Another object of the invention is to combine the means through which a virtual plane of convergence is selectively created with the means for measuring the distance of an object from the lens so as to shift the position of the plane of convergence in space in accordance with the distance of the object in space from the lens.

It is, furthermore, an object of the invention to improve the stereoscopic projection of pictures upon a receiving surface as a screen or the like, and particularly to avoid under all conditions that arrangement of the projected part-images which would compel the observer to force his eyes into a position of divergence in order properly to view the projected images. It is, furthermore, an object of the invention in the reproduction of stereoscopic images by projection to arrange the elements of a stereo-optic device in such manner that the eyes of the observer will automatically be able to accommodate themselves to the most favorable position of convergence to which the eyes would accommodate themselves if they would view the natural object represented by said images at the distance at which they are supposed to appear in the image.

Another object of the invention is to make use in a stereo-optic device of means for properly positioning the part-images to be produced or projected in their correct vertical relation in addition to the proper relative positioning of the part-images in their lateral relation. In this manner the invention avoids in stereoscopic pictures to be reproduced by projection a vertical displacement of the part-images appearing on the screen on which the projection takes place.

The invention also contemplates as one of its objects to provide ray deflecting or reflecting means for altering the actual plane of convergence in respect of its relation to the lens by providing aids for the eyes of the observer and to be easily attachable to or detachable from the person of the observer of these pictures or images for creating without any unnatural compulsion of eye movements, the proper accommodation required for the creation of the natural binocular impressions.

Aids of this character in the form of spectacles or the like are of particular advantage for observers who in a general way have difficulties when observing stereoscopic images to produce that fusion of these images which ultimately creates an impression similar to binocular vision.

With these and numerous other objects in view, embodiments of the invention are described in the following specification in which reference is made to the accompanying drawings.

In the drawings:

Fig. 1 shows diagrammatically an optical system of the known character amplified by means for virtually shifting the fixed plane of convergence of the system;

Fig. 2 shows partly in section and partly in side elevation the system for a stereoscopic camera having a single lens and permitting the plane of convergence to be shifted;

Fig. 3 is a diagrammatic rear elevation of a camera housing and showing the train of gears through which simultaneous adjustment of various parts of the camera may be produced.

Stereoscopic cameras are known in which a single lens is employed for producing stereooptically related images of the same object in the focal plane of the lens, in which focal plane obviously the film or other carrier of emulsion is located. In order to produce through a single lens a pair of stereoscopic images, the camera is equipped with a so-called stereo-attachment comprising suitably disposed light deflecting or reflecting means. These means for the production of a pair of stereoscopic images from an object through a single lens may be formed by prisms or reflectors in suitable angular relation to each other and to the lens. The spacing of these ray reflecting means from each other is usually designated the base of the stereo-optic attachment and is in similar relation to the lens as the base distance meters or range finders which are well known in the art. In stereo-optic attachments, however, the base usually has a length corresponding to the mean spacing of the human eyes from each other. It is obvious, however, that this base may be selected smaller or greater than this average interocular space.

Where a pair of lenses is used for producing stereoscopic pictures, as in stereo-cameras, the axes of the optical systems of the lens are parallel to each other. But upon the use of a stereo-attachment comprising ray deflecting means as prisms, reflectors or the like, the axes of these ray deflecting means converge towards a point on the optical axis of the lens and a plane imagined at the point of intersection of these axes and standing at right angle to the optical axis of the lens is the plane of convergence. Hence, the plane of convergence in stereo-attachments for cameras and for stereo-projecting devices is a fixed plane.

An optical system of this type is diagrammatically indicated in Fig. 1. In this figure the stereoattachment is shown as comprising a pair of prisms 1 disposed as for instance removably or at least at variable spacing in front of the lens 2. The angular reflecting surfaces of the prisms 1 are adapted to direct rays of light through the lens 2, and the rays 10 of incidence for the reflecting surfaces 11 of the prisms 1 may be considered the axes of the stereo-attachment. These axes 10 intersect each other in the plane indicated at 3. This is the plane of convergence located at the fixed distance c in front of the lens 2. A point 5 which is shown here as being located in the optical axis of the lens 2 may be assumed to be the central point or portion of an object to be photographed by the lens 2. Assuming then the focal plane of the lens to be located at 4, the points 5' and 5" within this focal plane 4 will constitute the central points of two images produced in the focal plane 4 by the lens 2. These two pictures are in proper stereoscopic relation to each other, and upon being viewed through suitable optical aids—will fuse into a single picture impression.

When the object to be photographed actually has the distance from the lens corresponding to the distance c which is equal to the distance of the plane of convergence from the lens, the average observer will have no difficulty in obtaining a fused impression corresponding to the binocular observation of the same object. But when the object is at a distance from the lens varying from the distance of the plane of convergence from the lens, then many observers have difficulties in forcing their eyes to accommodate themselves to produce the same impression as producible by binocular vision.

What has been stated here in respect of stereoscopic picture production by means of a single lens amplified by stereo-attachment also applies to stereo-cameras having two separate lenses, which lenses in ordinary stereo-cameras are disposed at fixed spacing from each other usually corresponding to the mean interocular space on adults. Here also the parallel optical axes may be considered as axes intersecting each other in the infinite, and therefore here also the relation of the part-images produced by the two lenses when photographing an object at relatively close distance from the camera is not that same relation which causes the fusion of binocularly observed pictures into one picture.

The difficulties encountered by some observers to accommodate their binocular vision to the relation of the part-images produced by cameras of these types are overcome by providing means which alter the location of the plane of convergence with respect to the lens. Obviously any alteration of the angular relation of the reflecting surfaces 11 and 12 in the prisms 1 of Fig. 1 would lead to an establishment of a plane of convergence different from that shown in Fig. 1. In place of the prisms, ordinary mirrors mounted in the stereo-attachment in such manner that they can be angularly adjusted relatively to each other and to the lens might be used.

Other means for virtually shifting the position of the plane of convergence may be formed by means which are interposed in the path of the rays of light emanating from the object, in which case then in spite of the greater or smaller distance of the object from the lens, the direction of the rays of light towards the reflecting surfaces 11 would be corrected to have an angle of incidence in respect of these reflecting surfaces corresponding to that angle of incidence which rays emanating from the actual plane of convergence would have.

These means of correction may be formed by prisms, additional reflectors, by rotary prismatic wedges or by wedges which are mounted in the attachment so as to oscillate about an edge or about an axis between the edges. In the diagrammatic showing of Fig. 1, these means for deflecting the rays of light to have an angle of incidence as desired for an attachment of a predetermined base are shown, as wedges 7 which obviously are transparent and have suitable refractory qualities. By interposing prismatic wedges 7 in the path of the rays of light emanating, for instance, from the point 8, there will also be created through the lens 2 a pair of part-images in which the central points 8', 8" have the same spacing from each other as the points 5', 5" previously referred to, but the plane of convergence 6 artificially created by the interposition of the correcting means 7 in the path of the light corresponds to the distance of the object photographed, and hence, the accommodation required from the observer for creating by binocular observation of the part-images whose central points are at 8', 8" the same impression as if the object at distance C would have to be observed, is the natural accommodation.

It is obvious that upon angular adjustment of the auxiliary ray deflecting means 7 with respect to the means 1, the plane of convergence at 6 may be brought in more closely or moved out farther away from the actual plane of convergence 3, this adjustment of the auxiliary means 7 may involve either an angular displacement or a rectilinear shifting of these prisms towards or away from the optical axes.

The adjustment mechanism for these auxiliary ray deflecting means may be connected directly with the adjusting mechanism for focusing the lens to objects of different distances, and the auxiliary mechanism also may be connected to a distance meter or even a connection of distance meter, adjusting mechanism, lens adjusting mechanism and mechanism for varying the plane of convergence may be combined.

In the embodiments illustrated in Figs. 2 and 3, a structure is shown in which by way of example the mechanism for varying the position of the plane of convergence is combined with the above two mentioned mechanisms.

In the camera illustrated in Fig. 2, the lens mounting 13 is axially adjustable by means of a nut 14 in engagement with the screw-threaded section 15 of the lens mounting. Since the nut 14 is held against axial displacement, it is obvious that a rotation of this nut will impart axial displacement to the mounting 13 which is fixed to the screw-threaded section 15. The nut is surrounded by a ring 16 through an opening of which a pinion 17 is in engagement with a gear rim 18 on the outer face of the nut. Hence, upon rotation of the pinion 17, an axial adjustment of the lens must necessarily take place.

This structure is mounted within a housing 19 which also may contain the two spools 20, 21 indicated diagrammatically only to receive the film on which the stereoscopic images are to be produced. The film 22 is for instance upon manipulation of certain mechanism, not illustrated, unwound from the reel 20 and directly wound on the spool 21. Between these two spools, the film is maintained in a position for receiving the images produced by the lens 13.

The camera also shown in front elevation in Fig. 3 comprises a base distance meter of which, however, in the front view of Fig. 3 solely a window 23 and a companion window 24 are illustrated, the spacing of these windows generally indicating the base of the distance meter. While the window 23 of the distance meter serves for direct observation of the object by the user of the camera, the adjustment of this meter to the proper distance is produced, for instance, by rotating a wedge-shaped element inserted in the window 24 and thereby altering the base conditions of the distance meter. Base distance meters of this character are very well known and require no further description. They are frequently combined with cameras.

The ray deflecting and reflecting elements in the form of prisms are shown in the interior of the housing at 25 and 26 respectively in such relation to the lens in the mounting 13 that rays of light of a certain angle of incidence with respect to the reflecting surfaces of the prisms 25, 26 will be directed through the lens to produce on the film 22 properly spaced stereoscopic images. The assembly of prisms 25, 26, therefore, constitutes a stereo-attachment for this camera, and in the present embodiment this stereo-attachment is provided with means for varying the location of the plane of convergence with respect to the lens contained in the mounting 13.

These auxiliary means affecting the position of the plane of convergence are formed by pairs of prismatic wedges, each of the prisms 25, 26 being associated with one of these pairs of prismatic wedges and the pairs of prismatic wedges being adjustable in accordance with the adjustment practiced on the lens and the mounting 13, and also practiced on the distance meter whose windows are indicated at 23 and 24.

It will be seen that a pair of wedges 27, 28 is associated with the prism 25 while a similar pair of wedges 29 and 30 in axial alinement is adjusted with the prism 26.

In adjusting a base distance meter of this type, as employed with cameras, it is customary to rotate the wedge shaped prismatic element associated with the window 24 until a certain condition referring to the object under observation can be noticed in the window 23 which is directly viewed by the user of the camera. The rotation of this adjustment element associated with the window 24 is effected in the present instance by a finger actuated gear 31 projecting beyond the housing of the camera. This gear may engage a gear 32 indicated diagrammatically only and fixed to the rotary element associated with the window 24 of the base distance meter.

The gear 32 forming a part of the adjustment mechanism for the base distance meter is in mesh with a gear 33 which is associated with the mounting 34 of the wedge 29 forming a part of the auxiliary means for the stereo-attachment. The gear 33, therefore, will impart rotation to the wedge 29 in accordance with the adjustment of the base distance meter of the camera. The gear 33 also actuates by means of three gears 35, 36, 37 a gear 38 which is associated with the mounting 39 of the front wedge 27 forming a part of the auxiliary means associated with the stereo-attachment and especially with the left hand prism 25. In order to adjust simultaneously also the wedge elements 28, 30 likewise shown as component parts of the auxiliary means associated with the stereo-attachment, the gear 36 not only meshes with the gear 37, but also meshes with a gear 40 which in its turn meshes with the gears 41 and 42 forming the actuating means for the mountings of the rear wedges 28 and 30. It will also be noted that owing to the arrangement of this train of gears, the rotation of the actuating finger wheel 31 will produce simultaneously rotation of the two wedges 27 and 28 and 29 and 30 of the two pairs in opposite directions. Owing to this arrangement of two wedges simultaneously rotated in opposite directions and the two wedges associated with each component element of the stereo-attachment, a correction of the angle of incidence of the ray of light in front of said stereo-attachment may be effected without altering the base of the stereo-attachment itself.

It is also apparent from Figs. 2 and 3, that the train of gears actuated by the finger wheel 31 may be used for imparting rotation to the pinion 17 by means of which the mounting of the lens is axially adjusted.

This camera, therefore, illustrated as being of the type of miniature cameras combines with the mechanism for focusing the lens and setting the camera to the proper distance from the object, means for altering the plane of convergence of the stereo-attachment in accordance with the adjustment applied to the lens and to the distance meter.

In the embodiments illustrated, the stereoscopic images are shown as having been produced on a film closely adjacent to each other. It may also be feasible, however, to produce stereoscopic images in superposition by a suitable adjustment of the optical equipment. Such images in partly superposed relation are also well known for stereoscopic purposes and are particularly favored where it is desired to view these stereoscopic superimposed images through special aids. The term "anaglyphic images" is frequently applied to the same.

It also has been proposed to produce a stereoscopic effect and create the impression of a three-dimensional picture by using one or more process screens through which sections of two pictures are alternately arranged on closely adjacent surface sections.

The present invention is adaptable to the production of pictures in either of the above methods of securing stereoscopic images.

As had been pointed out at the beginning, the invention also is particularly of use in the reproduction of stereoscopic images by projection. In the projection of the stereoscopic part-images, the images thrown on the projection screen must be in such relation to each other that the eyes of the observer follow as closely automatically and through the natural accommodation that position which they would assume in observing the object whose picture is projected if this object were at a distance from the observer, as represented by the image on the screen. If the eyes of the observers are caused to assume a position of divergence, the impression otherwise created by the fusion of stereoscopic images can never be produced and the impression created, therefore, is an impression entirely dissimilar to the impression of binocular observation and may even be very disturbing to the observer. How far it is feasible or even necessary to locate the part-images on the projecting screen in such relation to each other that the eyes of the observer assume the position of convergence which would correspond to the position of the object in nature at the distance represented by the screen image, depends upon various circumstances.

Particularly the requirements dealing with the limitation of the field of vision will be determining as to the selection of the stereoscopic part-screen images to each other. It has been shown, however, by numerous tests that even upon reproduction of stereoscopic pictures by projection, auxiliary ray deflecting means are largely helpful in avoiding that unnatural divergent position of the eyes which would become necessary when upon observing defective screen images an attempt were made to create a fusion of the impression. By suitably relating the part stereo-images projected on the screen to each other, there may readily be produced that convergent eye position which corresponds to the natural position for the selected object and distance.

While in the embodiment of the invention illustrated in Figs. 2 and 3, one of the wedges in each pair, as for instance the wedges 27, 29 of the auxiliary means, may be utilized for laterally correcting the position of the plane of convergence, and while the companion wedges 28, 30 in each of the pairs may effect a vertical correction for the same purpose, it is also feasible to separate the two ray-deflecting and correcting means in each of these pairs of wedges from each other.

While in the embodiment illustrated in Figs. 2 and 3, the wedge members 27, 29 in the two pairs are adjusted coincidentally with the adjustment of the wedge members 28, 30 of the two pairs, an adjustment is also feasible for properly positioning the stereoscopic images vertically by adjustment of the second named wedge members 28, 30 independently of the lateral or horizontal adjustment effected by rotation of the wedge members 27, 29.

We claim:

1. In a stereo-optic device of the character described, the combination of a lens means for focusing the lens with respect of an object to be photographed, a stereo-attachment in front of said lens and comprising a pair of fixedly mounted ray deflecting means forming a stereoscopic base for producing in the focal plane of said lens a pair of stereoscopic images of the object to be photographed, adjustable auxiliary optical means in front of each of said pair of fixedly mounted ray deflecting means for altering the direction of the rays of light passing through said lens in accordance with the distance of the object in front of said attachment, and means operatively connecting said lens focusing means with said adjustable auxiliary optical means for adjusting the latter whenever said lens is adjusted.

2. A stereo-optic device of the character described, comprising in combination with a lens, means for focusing the lens with respect of an object to be photographed, a distance meter, means for setting the distance meter in accordance with the distance of the object from said lens, said setting means for the distance meter being connected with the focusing means for the lens, a stereo-attachment in front of the lens and auxiliary means for adjusting said stereo-attachment, said auxiliary means being operatively connected with the setting means of said distance meter adjusting and lens focusing means.

3. A stereo-optic device of the character described, comprising in combination with a lens means for focusing the lens on objects of varying distance, a stereo-attachment adapted to produce in the focal plane of the lens stereoscopic pictures of an object in front of said lens, and auxiliary means connected with said stereo-attachment for adjusting the latter to produce stereoscopic pictures in the focal plane of the lens in proper stereoscopic relation in accordance with the said distance of the object from said lens, said auxiliary means comprising ray deflecting movably mounted wedges.

4. In a stereo-optic device of the character described, the combination of a lens, a distance meter, means for adjusting conjointly said distance meter and said lens to objects at varying distance from the lens, a stereo-attachment in front of said lens and adapted to produce in the focal plane of the lens a pair of stereoscopic pictures of an object disposed in front of the lens, and auxiliary means for adapting said stereo-attachment to varying distances of the objects in front of said lens, said auxiliary means being constructed as rotary prismatic wedges, and means operable by said lens and distance meter adjusting means for imparting rotary movement to said wedges.

5. In a stereo-optic device of the character described, the combination of a lens, means for focally adjusting said lens with respect to objects at varying distance therefrom, a stereo-attachment in front of said lens and adapted to produce stereoscopic pictures of objects in the focal plane of said lens, and auxiliary means for adapting said stereo-attachment to varying distances of the objects whose pictures are to be stereoscopically produced, said auxiliary means being adapted to correct the stereoscopic relation of the pictures produced through said stereo-attachment in vertical direction as well as in horizontal direction.

6. In a stereo-optic device of the character described, the combination of a lens, means for focally adjusting said lens with respect to objects at varying distance therefrom, a stereo-attachment in front of said lens adapted to produce in the focal plane of the lens stereoscopically related pictures of objects located in front of said lens, a distance meter adjustable to varying distances conjointly with said lens adjusting means, and auxiliary means for adapting the stereo-attachment to varying distances of the objects whose pictures are to be reproduced stereoscopically, said auxiliary means comprising a pair of axially alined rotary prismatic wedges, and rotary means operable upon actuation of said lens and distance meter adjusting means for simultaneously adjusting the prismatic wedges of the pair about their axis.

HANS SAUER.
OTTO VIERLING.